United States Patent
Venigalla

(10) Patent No.: US 7,803,235 B2
(45) Date of Patent: Sep. 28, 2010

(54) PASSIVATION OF TANTALUM AND OTHER METAL POWDERS USING OXYGEN

(75) Inventor: Sridhar Venigalla, Macungie, PA (US)

(73) Assignee: Cabot Corporation, Boston, MA (US)

( * ) Notice: Subject to any disclaimer, the term of this patent is extended or adjusted under 35 U.S.C. 154(b) by 1258 days.

(21) Appl. No.: 11/031,099

(22) Filed: Jan. 7, 2005

(65) Prior Publication Data

US 2005/0150576 A1    Jul. 14, 2005

Related U.S. Application Data

(60) Provisional application No. 60/535,604, filed on Jan. 9, 2004, provisional application No. 60/535,167, filed on Jan. 8, 2004.

(51) Int. Cl.
*C23C 8/06* (2006.01)

(52) U.S. Cl. ...................................... 148/281; 361/529

(58) Field of Classification Search ................. 148/422, 148/281; 361/305, 529; *C23C 8/38*
See application file for complete search history.

(56) References Cited

U.S. PATENT DOCUMENTS

| 5,448,447 A | 9/1995 | Chang | 361/529 |
| 6,430,026 B1 * | 8/2002 | Nagato et al. | 361/305 |
| 6,517,645 B2 | 2/2003 | Fife | 148/422 |
| 6,558,447 B1 | 5/2003 | Shekhter et al. | 75/252 |
| 6,759,026 B2 | 7/2004 | Kimmel et al. | 423/592.1 |
| 2002/0088507 A1 * | 7/2002 | Rao et al. | 148/422 |

FOREIGN PATENT DOCUMENTS

EP    798398 A2 *    10/1997

* cited by examiner

*Primary Examiner*—Roy King
*Assistant Examiner*—Weiping Zhu

(57) ABSTRACT

A method to passivate a metal or metal oxide or metal suboxide powder, especially a valve metal powder such as tantalum or niobium and the passivated powders formed therefrom are described. The method includes passivating a starting powder with a gas having at least 25 wt. % oxygen present. Passivation is preferably achieved without performing any evacuation steps. Capacitors made from the passivated powders are also described.

21 Claims, No Drawings

PASSIVATION OF TANTALUM AND OTHER METAL POWDERS USING OXYGEN

This application claims the benefit under 35 U.S.C. §119(e) of prior U.S. Provisional Patent Application Nos. 60/535,604 filed Jan. 9, 2004, and 60/535,167 filed Jan. 8, 2004, which are incorporated in their entirety by reference herein.

BACKGROUND OF THE INVENTION

The present invention relates to valve metal powders and other metal powders of acceptable quality for use in such applications as capacitors, sputter targets, and the like. More particularly, the present invention relates to methods of surface passivation metal powders.

Valve metals, e.g., tantalum and niobium, are generally extracted from their ores in the form of powders. Tantalum powders, for example, that are suitable for use in high performance capacitors, can be produced by chemical reduction, such as sodium reduction, of potassium fluorotantalate. In this process, the potassium fluorotantalate is recovered from processed ore in the form of a dry crystalline powder. The potassium fluorotantalate is melted and reduced to tantalum metal powder by sodium reduction. The tantalum powder formed is then water washed and acid leached, as described, for example, in U.S. Pat. Nos. 6,312,642, and 5,993,513, which are incorporated in their entireties herein by reference. The tantalum is then dried, resulting in what is known as a basic lot powder.

Typically, the basic lot powder is subjected to a heat treatment or thermal agglomeration step and then passivated and stabilized to obtain a powder cake that is subsequently ground up into a powder. A deoxidation step using an oxygen getter is then performed. After the deoxidation step, the tantalum powder can again be passivated to form a passive oxide coating on its surface to form stabilized powder particles. Other techniques used in the processing of tantalum powder to improve the performance characteristics of the finished products made from the metal powder include reacting small quantities of modifying agents to the tantalum powder. A range of additives or "dopants" have been used, including nitrogen, silicon, phosphorous, boron, carbon, and sulfur. Nitriding, for example, can occur between or during any of the aforementioned processing steps. The processed tantalum powder can then be pressed into a pellet and sintered for subsequent processing by capacitor anode manufacturers for example. Another example of a use of the tantalum powder is the isostatic consolidation of the tantalum powder to produce metal articles such as sputter targets.

As mentioned, performance characteristics of the products made from the metal powder can be related to microstructure characteristics of the metal powder. Of particular interest, capacitance and DC leakage of metallic capacitors can be related to the specific surface area of the metal powder used to form the sintered metal body. Greater net surface area can be achieved, of course, by increasing the quantity (grams) of metal per pellet; but, cost and size considerations have dictated that development be focused on means to increase the specific area of the metal powder, that is, to increase volumetric efficiency. Due to the very fine particle size and high surface area, electrolytic capacitor grade metal powders such as tantalum and niobium need to be passivated to prevent a violent reaction upon exposure to atmospheric oxygen that can possibly result in combustion.

Conventional techniques to passivate tantalum and niobium particles involve controlled exposure to atmospheric air in a gradual or a step-wise increase in pressure. Depending on the surface area of the powder, multiple vent/evacuation cycles may be needed at each pressure step to equilibrate the surface with oxygen partial pressure. A primary reason for vent/evacuation cycles is that atmospheric air consists of approximately only 20 wt. % oxygen, with the balance being predominantly nitrogen. Residual nitrogen that is trapped between the powder particles is preferably evacuated before further venting of fresh air. Because the capacitor powder industry is moving toward ever higher surface area of the particles, the necessary number of vent/evacuation cycles has also increased, adding costs and production time for producing suitable metal powders.

Accordingly, a need exists to reduce the number of vent/evacuation cycles needed to surface passivate capacitor grade metal powders, and/or to eliminate the need altogether for the evacuation step in passivating metal powders.

SUMMARY OF THE PRESENT INVENTION

It is therefore a feature of the present invention to provide a method to passivate a high surface area metal powder that avoids the trapping of residual inert gas between powder particles.

Another feature of the present invention is to provide a method of at least partially surface passivating a metal powder that includes fewer vent/evacuation cycles than are used in conventional methods of passivating metal powders.

A further feature of the present invention is to provide a method to passivate a tantalum or other metal powder in which passivation occurs anytime before, during, or after any of the steps of heat treating, deoxidizing, nitriding, delubing, granulating, agglomerating, milling, and/or sintering of the tantalum or niobium powder.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a method to passivate a metal powder. The method preferably includes passivating the metal powder with a gas having at least 25 wt. % oxygen present to form a passivated metal powder.

The present invention further relates to a method to passivate a metal powder that includes passivating the metal powder with a gas that has less than 10 wt. % inert gases present.

The present invention also relates to a method to passivate a metal powder that includes passivating the metal powder with a gas having less than about 75 wt. % nitrogen.

The present invention also relates to a method to passivate valve metal powder with a gas having at least 25 wt. % oxygen present to form a passivated metal powder having a BET surface area of from about 0.2 to about 10 $m^2/g$ or more.

It is to be understood that both the foregoing general description and the following detailed description are exemplary and explanatory only and are intended to provide a further explanation of the present invention, as claimed.

DETAILED DESCRIPTION OF THE PRESENT INVENTION

A method to passivate a metal, metal oxide, and/or metal suboxide powder and alloys thereof according to the present invention includes passivating the metal powder with a gas having at least 25 wt. % oxygen present to form a passivated metal powder. The method optionally includes passivating without any evacuation cycles.

For purposes of the present invention, surface passivation of the metal powder can be characterized by absorbed oxygen gas or formation of a metal oxide on the surface of the passivated metal powder. The passivation layer can be a substantially continuous layer, or a non-uniform or dispersed layer. The passive coating can be from about 20 to about 200 angstroms thick, for example.

In more detail, the metal powder can be any metal, and is preferably any metal that is a target grade metal or a capacitor grade metal, and is more preferably a capacitor grade material having a capacitance capability of from about 10,000 to about 400,000 CV/g or more. Preferably, the metal is a valve metal which generally includes tantalum, niobium, and alloys thereof, and also may include metals of groups IVB, VB, and VIB of the Periodic Table of the Elements, and aluminum and copper, and alloys thereof. Valve metals are described, for example, by Diggle, in "Oxides and Oxide Films," Vol. 1, pp. 94-95, 1972, Marcel Dekker, Inc., New York, incorporated in its entirety by reference herein. Also, the powder can be a metal oxide (e.g., a valve metal oxide, such as $Ta_2O_5$ or $Nb_2O_5$) or can be a metal suboxide powder (e.g., a valve metal suboxide, such as a niobium suboxide, such as NbO, $NbO_{0.7}$, $NbO_{1.1}$, and the like, such as described in U.S. Pat. Nos. 6,479,012; 6,462,934; 6,432,161; 6,420,043; 6,416,730; 6,402,066; 6,375,704; 6,373,685; 6,322,912; and 6,231,689, all incorporated in their entirety by reference herein. A method of preparing niobium oxide or suboxides is set forth in U.S. Provisional Patent Application No. 60/535,167, which can include heat treating a niobium oxide in the presence of a reducing agent, and optionally, in the absence of a solid getter material.

Examples of tantalum powders are described in U.S. Pat. Nos. 6,348,113 B1; 5,580,367; 5,580,516; 5,448,447; 5,261,942; 5,242,481; 5,211,741; 4,940,490; and 4,441,927, which are incorporated herein in their entireties by reference. Examples of niobium powders and other metal powders are described in U.S. Pat. Nos. 6,420,043 B1; 6,402,066 B1; 6,375,704 B1; 6,165,623; 5,306,462; 5,245,514; 5,217,526; 4,684,399; 4,555,268; and 3,779,717, which are incorporated herein in their entireties by reference. The metal powder can contain nitrogen or a nitride layer, as described, for example, in U.S. Pat. Nos. 6,338,816 and 6,051,044; and Published U.S. patent application Nos. 2002/0069724 and 2002/0088507, which are incorporated in their entireties herein by reference.

The purity and/or particle size and other properties of the metal powder, including size and the like are not critical to the present invention. The powder used to practice the present invention can have any purity with respect to the metal. For instance, the purity can be 99% or greater such as from about 99.5% or greater and more preferably 99.95% or greater and even more preferably 99.99% or greater, or 99.995% or greater or 99.999% or greater. Examples of the type of powder that can be used include, but are not limited to, flaked, angular, nodular, spherical, and mixtures or variations thereof. The powder can be hydrided or non-hydrided, agglomerated or unagglomerated. Preferably, the primary particle size is from about 0.05 to about 5 microns Also, the powders can be granules with a preferred granule size of from about 10 to about 1000 microns. The powders can have a preferred flow of from about 100 to about 1000 mg/s. With respect to $D_{10}$, $D_{50}$, and $D_{90}$ distribution of the powder, the D10 and D90 are preferably within 300% of the D50. The powder preferably has a bimodal or multi-modal distribution. The powder and sintered body can have preferred pore sizes from about 0.01 to about 1000 microns. The powders can have a Scott density or an apparent density for tantalum of from about 15 to about 40 $g/in^3$; and for niobium and niobium suboxides of from about 10 to about 30 $g/in^3$. The powders can have a preferred tap density of from about 10 to about 90% of theoretical density. The powders can have other properties above and below the numerical values described above. Further, the powders can be doped with one or more materials, such as nitrogen, boron, phosphorous and the like.

Preferably, the metal, metal oxide, or metal suboxide powder has a high specific surface area (e.g., high BET). Further, the metal powder, metal oxide, or metal suboxide used to practice the present invention can be characterized as having a preferred specific surface area (BET) of from about 0.2 to about 40 $m^2/g$ or more, such as from about 1 to about 15 $m^2/g$, or from about 1.5 to about 10 $m^2/g$, or from about 2 to about 6 $m^2/g$. The preferred apparent density of the powder is less than about 2 g/cc, more preferably, less than 1.5 g/cc, and more preferably, from about 0.5 to about 1.5 g/cc.

Passivating the powder can be by any suitable method. Passivation can be achieved in any suitable container, for example, in a retort, a furnace, a vacuum chamber, or a vacuum furnace. Passivation preferably is achieved in any of the equipment used in processing, such as heat treating, deoxidizing, nitriding, delubing, granulating, milling, and/or sintering, the metal powder. Preferably, passivating the metal powder is achieved under vacuum. Passivation preferably includes step-wise and/or gradual backfilling of the container with a gas having an oxygen content level that is greater than that of air or atmospheric air. Preferably, the metal powder is passivated in the presence of a gas having at least 25 wt. % oxygen, more preferably, at least 50 wt. % oxygen, even more preferably, at least 75 wt. % oxygen, even more preferably, at least 90 wt. % oxygen, and most preferably, from about 99 to about 100 wt. % oxygen. Passivation preferably includes step-wise and/or gradual backfilling of the container with a gas having a nitrogen content level that is less than that of air or atmospheric air. Preferably, the metal powder is passivated in the presence of a gas having less than 75 wt. % nitrogen gas present, more preferably, less than 50 wt. %, and most preferably, less than 25 wt. % present. Passivation preferably includes step-wise and/or gradual backfilling of the container with a gas having an oxygen content level that is greater than that of air or atmospheric air, and having a nitrogen content level that is less than that of air. Preferably, the metal powder is passivated in the presence of a gas having less than 10 wt. % inert gas(es) present, more preferably, less than 5 wt. %, and most preferably, no inert gas(es) present. The same applies to metal oxides and/or metal suboxides.

Passivation can be achieved by a step-wise or cyclic increase in operating pressure in the container, a gradual increase in operating pressure, or a combination thereof (venting). Cyclic passivation can include venting and evacuation of the container. For purposes of the present invention, a cycle of passivation can include increasing the operating pressure in the container in which the metal powder is contained by a predetermined amount, and maintaining or holding the increased container pressure for a predetermined amount of time, a complete cycle comprising venting/holding. Optionally, another cycle can then be initiated by a further increase in operating pressure. For purposes of the present invention, a cycle of passivation can also include increasing the operating pressure of the passivation container by a predetermined amount, and maintaining the increased container pressure for a predetermined time, followed by an evacuation of the passivation container or decreasing the operating pressure by a predetermined amount, a complete cycle comprising venting/holding/evacuation. Optionally, a subsequent passivation cycle can then be initiated by a further venting of the passivation container.

Preferably, passivation is achieved in an environment in which the powder such as valve metal powder, e.g., tantalum or niobium powder, is stabilized by at least partially surface passivating a plurality of the particles of the powder in the fewest number of passivation cycles and/or in the least amount of passivation time as possible. The passivation container can have any starting pressure prior to passivation, and preferably, the passivation container is under vacuum, for example, from about 0.1 to about 1 torr. According to one embodiment of the present invention, passivation of the powder is initiated by cyclic exposure to progressively higher partial pressures of gas that contains oxygen. For example, the pressure in the passivation container can be increased by an amount of from about 5 to about 100 torr, and preferably, from about 10 to about 25 torr by backfilling the passivation container with a gas having an oxygen content level that is greater than that of air. Preferably, the gas used to backfill the passivation container has at least 25 wt. % oxygen present. The backfill gas can also include inert gases such as nitrogen, argon, hydrogen, and others that preferably do not react with the metal powder. Preferably, the inert gas(es) is present in an amount that is less than the amount of inert gas in air. Preferably, the backfill gas has a nitrogen gas content level that is less than that of air. Preferably, the backfill gas has less than 10 wt. % inert gas(es) present. Preferably, the backfill gas has less than about 75 wt. % nitrogen gas present. The pressure in the passivation container can then be maintained for a hold time of from about 1 to about 10 minutes or more. Preferably, the hold time is sufficient to allow at least some of the oxygen present in the gas to react with the powder so as to at least partially surface passivate at least some of the particles. According to one embodiment of the present invention, this constitutes a passivation cycle.

According to another embodiment of the present invention, the passivation cycle alternatively can further include at least one evacuation step. The step of evacuating the passivation container preferably is sufficient to remove some, most, or all of any residual inert gas(es) present in the powder. Evacuating the passivation container can be achieved by reducing the pressure to a value of 0.1 to about 50 torr. The container can be evacuated to a pressure that is less than the initial pressure in the container, or is preferably evacuated to a pressure that is equal to or greater than the initial operating pressure. Upon achieving the desired vacuum pressure in the passivation container, the container can then be pressurized to a predetermined operating pressure by backfilling the container with a predetermined amount of gas, for example, from about 5 to about 100 torr, which gas includes oxygen and/or inert gas(es). Preferably, the container is backfilled with a gas having an oxygen content level that is greater than that of the gas used in the immediate prior passivation cycle. More preferably, the gas used in subsequent passivation cycles to the initial passivation cycle has at least 50 wt. % oxygen present. Preferably, the container is backfilled with a gas having a content level of inert gas(es) that is less than the inert gas content level of the gas used in the immediate prior passivation cycle. Preferably, the container is backfilled with a gas having a content level of nitrogen that is less than that of the gas used in the immediate prior passivation cycle. More preferably, the gas used in subsequent passivation cycles to the initial passivation cycle has less than about 50 wt. % nitrogen present. The operating pressure in the passivation container can then be maintained for a predetermined hold time, for example, from about 1 to about 10 minutes. Preferably, the hold time is sufficient to allow the oxygen present in the gas to react with the metal or metal oxide or metal suboxide powder so as to at least partially surface passivate the particles. Following venting and holding, a further passivation cycle can be initiated by again evacuating the container to about 0.1 to about 50 torr. Evacuating the container can be to any operating pressure, and is preferably to a pressure that is greater than the operating pressure achieved by evacuation of the container in the immediate prior passivation cycle. Evacuation preferably is sufficient to at least partially remove any residual inert gas(es) that may be present in the powder. Upon achieving the desired operating pressure, the pressure within the container can then be increased to a predetermined operating pressure by backfilling the container with a gas that includes oxygen and/or inert gas(es) in any proportion. Preferably, the gas used to backfill the container has an oxygen content level that is greater than that of the gas used in the immediate prior passivation cycle. More preferably, the gas used to backfill the container has at least 75 wt. % oxygen present. Preferably, the gas used to backfill the container has an inert gas content level that is less than that of the gas used in the immediate prior passivation cycle. Preferably, the gas used to backfill the container has a nitrogen content level that is less than that of the gas used in the immediate prior passivation cycle. More preferably, the gas used to backfill the container has less than about 25 wt. % nitrogen present. The operating pressure in the passivation container can then be maintained for a predetermined hold time that is less, greater, or the same as the previous hold time. The passivation container can then be to about 0.1 to about 50 torr, to a predetermined operating pressure that is preferably greater than the operating pressure achieved by evacuation during the immediate prior passivation cycle. Upon achieving the predetermined operating pressure in the container, a subsequent passivation cycle can be initiated by increasing the operating pressure of the container to a predetermined pressure by backfilling the container using a predetermined amount of gas, for example, by increasing the pressure to a final value of 5 to about 760 torr, which gas can include oxygen and/or inert gas(es). Preferably the gas used to backfill the container has an oxygen content level that is greater than that of the gas used in the immediate prior passivation cycle. Preferably, the gas used to backfill the container has at least 90 wt. % oxygen present, and more preferably from about 99 to about 100 wt. %. Preferably, the gas used to backfill the container has a nitrogen content level that is less than that of the gas used in the immediate prior passivation cycle. Preferably, the gas used to backfill the container has an inert gas content level that is less than that of the immediate prior passivation cycle. More preferably, the gas used to backfill the container has less than about 5 wt. % inert gas(es) present. The operating pressure in the passivation container can then be maintained for a predetermined hold time that is either different from or the same as any other hold time.

Passivation can include a fewer or a greater number of cycles than described above, sufficient to form a passivated powder. The number of cycles needed to form a passivated powder can relate to the specific surface area, form, shape, type, amount, and the like of the powder, as well as to passivation pressures, temperatures, hold times, equipment, and passivating gas concentrations and the like. The number of passivation cycles can be, for example, from about 5 to about 50 or more. A passivation cycle can be any amount of time, for example, from about 1 to about 30 minutes or more. Total passivation time can depend on any or all of the aforementioned parameters, and can be for a time of from about 30 to about 600 minutes or more, for instance. The number of cycles, cycle time, and overall passivation time can be reduced, as well as the evacuation eliminated altogether by passivating the powder with a gas having a higher concentration of oxygen, for instance, above 30 wt. %, and preferably from about 99 to about 100 wt. % oxygen present. Any combination of vent/hold or vent/hold/evacuation cycles of passivation as described above can be used to form a passivated metal, metal oxide, and/or metal suboxide powder.

According to one embodiment of the present invention, passivation includes a gradual increase in the operating pressure from an initial operating pressure of the passivation container by backfilling the passivation container with a gas. For example, the container can be backfilled with an oxygen-enriched gas at a rate of from about 0.5 to about 100 torr/min. In this manner, the steps of holding and/or evacuating can be eliminated. Preferably, passivation with a gas having above 30 wt. % oxygen, and more preferably from about 99 to about 100 wt. % oxygen present avoids the need to evacuate the passivation container following venting of the container. Elimination of or a reduction in the number of hold steps or evacuation steps can reduce the overall passivation time required to form the desired passivated powder. Passivation by gradual backfilling can be used in any combination of passivation cycles as described above.

Passivation can be at any temperature that allows formation of a passive surface coating on the particles of the powder. For example, the temperature within the passivation container can be from about 20 to about 90° C. The temperature within the passivation container can be held constant during passivation or can be increased or decreased during any single passivation cycle, at certain stages, and/or during the entire passivation process. The passivation temperature within the container can depend on the prior, concurrent, or subsequent processing steps performed on the powder. The hold times can be the same or different for multiple-cycle passivation. Other actions can be taken that affect the formation of a passive coating on the powder particles such as movement of the passivation container and/or agitation of the metal, metal oxide, and/or metal suboxide powder during passivation.

As noted above, passivation can be achieved anytime before, during, or after any of the steps of heat treating, deoxidizing, nitriding, delubing, granulating, agglomerating, milling, and/or sintering of the powder. Any of the processing steps can be achieved by any suitable method. Preferably, passivation is performed after the step of heat treating and/or the step of deoxidizing the powder. The metal powder can be passivated multiple times.

The passivated powder of the present invention can have any purity, texture, and/or grain size, and other properties of the powder, including size and the like are not critical to the present invention. The passivated powder of the present invention can have any purity with respect to the metal. For instance, the purity can be 99% or greater such as from about 99.5% or greater and more preferably 99.95% or greater and even more preferably 99.99% or greater, or 99.995% or greater or 99.999% or greater. Examples of the type of passivated powder that can be formed by the present invention include, but are not limited to, flaked, angular, nodular, spherical, and mixtures or variations thereof. The passivated powder can be hydrided or non-hydrided, agglomerated or unagglomerated. In general, the passivated powder of the present invention preferably has a high specific surface area. In more detail, the passivated powder of the present invention can be characterized as having a preferred BET of from about 0.2 to about 40 m$^2$/g or more, such as from about 1 to about 10 m$^2$/g, or from about 1.5 to about 10 m$^2$/g, or from about 2 to about 6 m$^2$/g. The preferred apparent density of the passivated powder is less than about 2 g/cc, more preferably, less than 1.5 g/cc, and more preferably, from about 0.5 to about 1.5 g/cc. The passivated powder can have a primary particle size ($D_{50}$) of less than 0.1 micron to about 5 microns or more.

The passivated powder of the present invention can be further characterized by the electrical properties resulting from the formation of a capacitor anode using the passivated powder of the present invention. In general, the passivated powder of the present invention can be tested for electrical properties by pressing the passivated powders into an anode and sintering the pressed powder at appropriate temperatures and then anodizing the anode to produce an electrolytic capacitor anode which can then be subsequently tested for electrical properties. In more detail, the passivated powder is preferably any metal or oxide thereof that is a target grade metal or oxide thereof or a capacitor grade metal or oxide thereof, and is more preferably a capacitor grade material having a capacitance capability of from about 10,000 to about 400,000 CV/g or more.

Accordingly, another embodiment of the present invention relates to anodes for capacitors formed from the passivated powders of the present invention. Anodes can be made from the powder in a similar process as used for fabricating anodes, i.e., pressing porous pellets with embedded valve metal lead wires followed by sintering and anodizing. The capacitor anode can be formed by any method, for example, as described in U.S. Pat. Nos. 6,527,937 B2; 6,462,934 B2; 6,420,043 B1; 6,375,704 B1; 6,338,816 B1; 6,322,912 B1; 6,616,623; 6,051,044; 5,580,367; 5,448,447; 5,412,533; 5,306,462; 5,245,514; 5,217,526; 5,211,741; 4,805,704; and 4,940,490, all of which are incorporated herein in their entireties by reference. Anodes made from some of the passivated metal powders of the present invention can have a capacitance of from about 10,000 CV/g or lower to about 400,000 CV/g or more. In forming the capacitor anodes of the present invention, a sintering temperature can be used which will permit the formation of a capacitor anode having the desired properties. The sintering temperature can be based on the passivated powder used. Preferably, the sintering temperature is from about 1200 to about 1750° C. when the passivated metal powder is a passivated niobium powder. The sintering temperatures when the passivated metal powder is a passivated tantalum powder can be the same as for niobium powders.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method to passivate a powder comprising passivating said powder with a gas having at least 25 wt. % oxygen present to form a passivated powder, wherein said powder is tantalum powder, niobium powder, or niobium suboxide powder, and wherein said powder has a BET surface area of from 0.2 to 40 $m^2/g$, and a capacitance capability of from 10,000 to 400,000 CV/g.

2. The method of claim 1, wherein said powder is a nitrided metal powder.

3. The method of claim 1, wherein said powder is tantalum.

4. The method of claim 1, wherein said powder is niobium or a niobium suboxide.

5. The method of claim 1, wherein said gas has at least 75 wt. % oxygen present.

6. The method of claim 1, wherein said gas has from about 99 to about 100 wt. % oxygen present.

7. The method of claim 1, wherein said gas has no inert gases present.

8. The method of claim 1, wherein said gas has less than 5 wt. % inert gases present.

9. The method of claim 1, wherein said gas has less than about 25 wt. % nitrogen.

10. The method of claim 1, wherein said passivation is at a temperature of from about 20 to about 90° C.

11. The method of claim 1, wherein said passivation forms an oxide layer having a thickness of from about 20 to about 200 Angstrom.

12. The method of claim 1, wherein said passivation is achieved without any evacuation cycles.

13. The method of claim 1, wherein said powder is niobium powder.

14. The method of claim 1, wherein said powder has a primary particle size from about 0.05 to about 5 microns.

15. The method of claim 14, wherein said powder is granules with a granule size of from about 10 to 1,000 microns.

16. The method of claim 1, wherein said powder has a D10, D50, and D90 distribution and said D10 and said D90 are within 300% of said D50.

17. The method of claim 1, wherein said powder has a bi-modal or multi-modal distribution.

18. The method of claim 1, wherein said powder has a pore size of from about 0.01 to about 1,000 microns.

19. The method of claim 1, wherein said powder is tantalum and has a Scott density of from about 15 to about 40 $g/in^3$.

20. The method of claim 1, wherein said powder is niobium or niobium suboxide and has a Scott density of from about 10 to about 30 $g/in^3$.

21. The method of claim 1, wherein said BET surface area is from 1.5 to 10 $m^2/g$.

* * * * *